(12) United States Patent
Janssen et al.

(10) Patent No.: US 6,533,422 B2
(45) Date of Patent: Mar. 18, 2003

(54) PROJECTOR HAVING OPTICAL COMPONENTS IMMERSED IN LIQUID

(75) Inventors: Peter J. Janssen, Scarborough, NY (US); John Alfred Domm, Kitchener (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 31 days.

(21) Appl. No.: 09/920,711

(22) Filed: Aug. 3, 2001

(65) Prior Publication Data

US 2003/0025887 A1 Feb. 6, 2003

(51) Int. Cl.[7] .................. G30B 21/22; G30B 21/18; G30B 21/26
(52) U.S. Cl. .......................................... 353/119; 353/54
(58) Field of Search ..................... 353/54, 119

(56) References Cited

U.S. PATENT DOCUMENTS

| | | | | |
|---|---|---|---|---|
| 5,398,082 A | * | 3/1995 | Henderson et al. | 348/761 |
| 5,795,047 A | * | 8/1998 | Sannohe et al. | 353/34 |
| 5,805,255 A | * | 9/1998 | Mori et al. | 165/104.31 |
| 6,183,091 B1 | * | 2/2001 | Johnson et al. | 349/9 |

* cited by examiner

*Primary Examiner*—Russell Adams
*Assistant Examiner*—Andrew Sever

(57) ABSTRACT

An optical projection system having optical components immersed in a liquid. An enclosure holds the liquid, a spherical lens, a polarizer, a polarizing beam splitter, a reflective light valve having a retarder foil, and an exit window. The liquid stabilizes the thermal environment, reduces the need for antireflective coatings, enables a reduction in the number of optical components, and enables high optical flux.

29 Claims, 2 Drawing Sheets

PROJECTOR HAVING OPTICAL COMPONENTS IMMERSED IN LIQUID

BACKGROUND OF THE INVENTION

1) Field of the Invention

This invention relates to light projectors. More particularly it relates to light projectors having optical components, such as retarder foils, polarizers, beam splitters, and light valves.

2) Description of the Related Art

Optical projectors are common devices that are used to produce images on a screen. Such projectors are finding wide spread use as television displays, computer screen displays, and theatre displays. Optical projectors, particularly liquid crystal optical projectors, are beneficial because they produce large images using relatively small, inexpensive devices.

Typical liquid crystal optical projectors include a light source that illuminates an optical projection system. Such optical projection systems usually include an input optical subsystem having a first window, an input lens that collimates and focuses the illuminating light, and a polarizing prism. The polarizing prism selectively reflects the portion of the focused light that has the correct polarization direction experienced by off axis light rays, while the reflective liquid crystal light valve selectively changes the polarization of the light that is reflected back through the second window and into the prism. The prism then passes the portion of the light that has changed polarization through a third window onto the display screen.

While generally successful, typical optical projection systems have problems. First, the light from the light source passes through a large number of optical elements, each of which increases cost and each of which can produce undesirable birefringence. Furthermore, the various windows often require relatively expensive antireflective coatings on one or more optical surfaces. Also, the prism tends to be relatively expensive and tends to have imperfections that are detrimental to overall operation. Another problem relates to the alignment of the optical components. Thermal differences across the system can produce significant optical path length changes that can have detrimental effects on overall system performance.

Therefore, a new optical projection system would be beneficial. Even more beneficial would be a new optical projection system that reduces the number of optical components. Even more beneficial would be an optical projection system that reduces thermal differences, and that reduces the need for antireflective coatings.

SUMMARY OF THE INVENTION

The principles of the present invention enable optical projection systems having a reduced number of optical components. The principles of the present invention also enable optical projection systems having reduced thermal differences. The principles of the present invention further enable optical projection systems that do not require antireflective coatings.

An optical projection system in accord with the principles of the present invention includes a polarizer, a polarizing beam splitter, and a reflective light valve immersed in a liquid, such as water, contained in a housing. Beneficially, the housing also includes an input lens, such as a spherical lens, an exit window, and a light valve. Also beneficially, the light valve includes a retarder foil.

Additional features and advantages of the present invention will be set forth in the description that follows, and in part will be apparent from that description, or may be learned by practice of the invention.

BRIEF DESCRIPTION OF THE DRAWINGS

The accompanying drawings, which are included to provide a further understanding of the invention and which are incorporated in and constitute a part of this specification, illustrate an embodiment of the present invention and, with the description, serve to explain the principles of the invention.

In the drawings.

DETAILED DESCRIPTION

Reference will now be made in detail to an illustrated embodiment of the present invention, the example of which is shown in the accompanying drawings.

Figure 1:
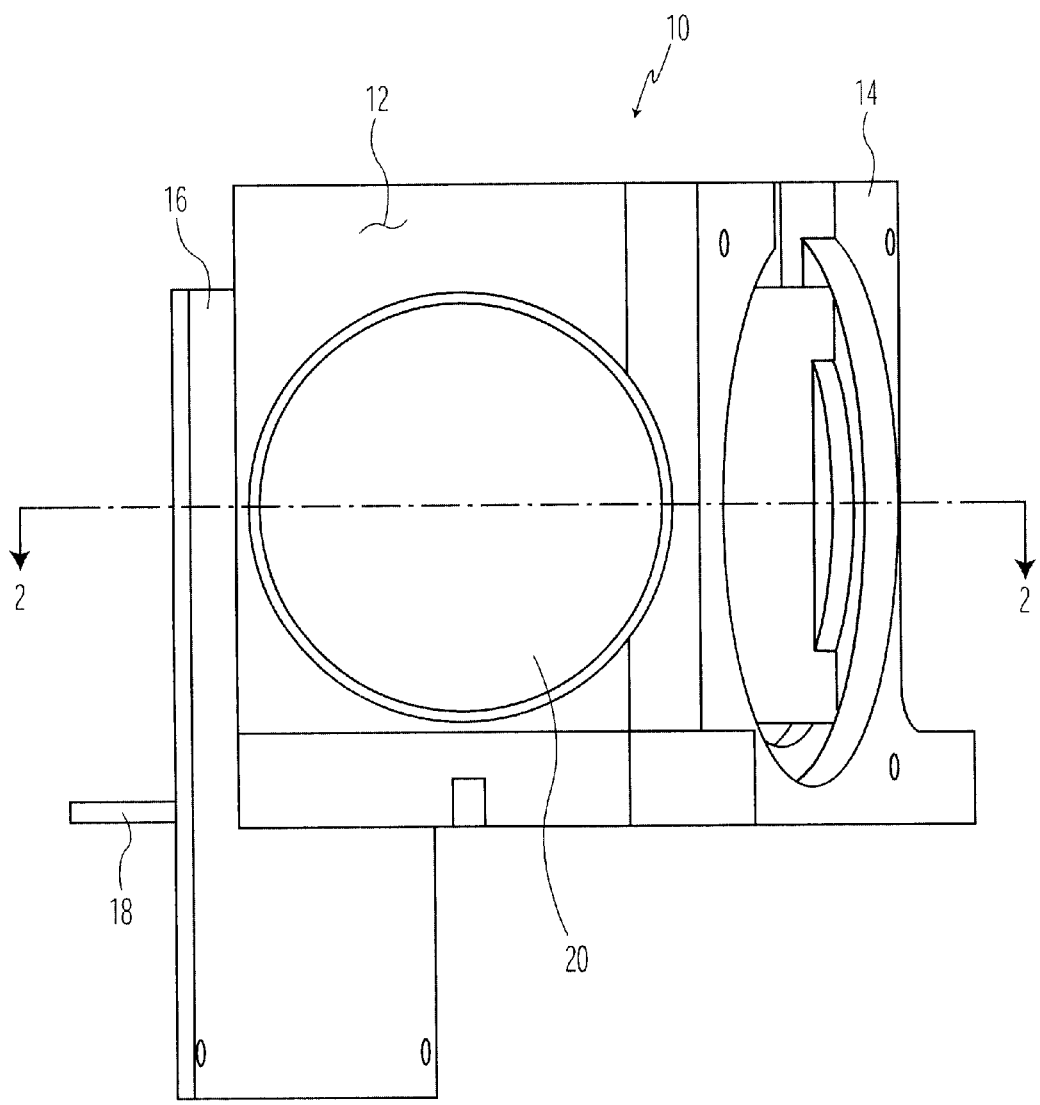
FIG. 1 illustrates an enclosure of an optical projection system that is in accord with the principles of the present invention.
Figure 2:
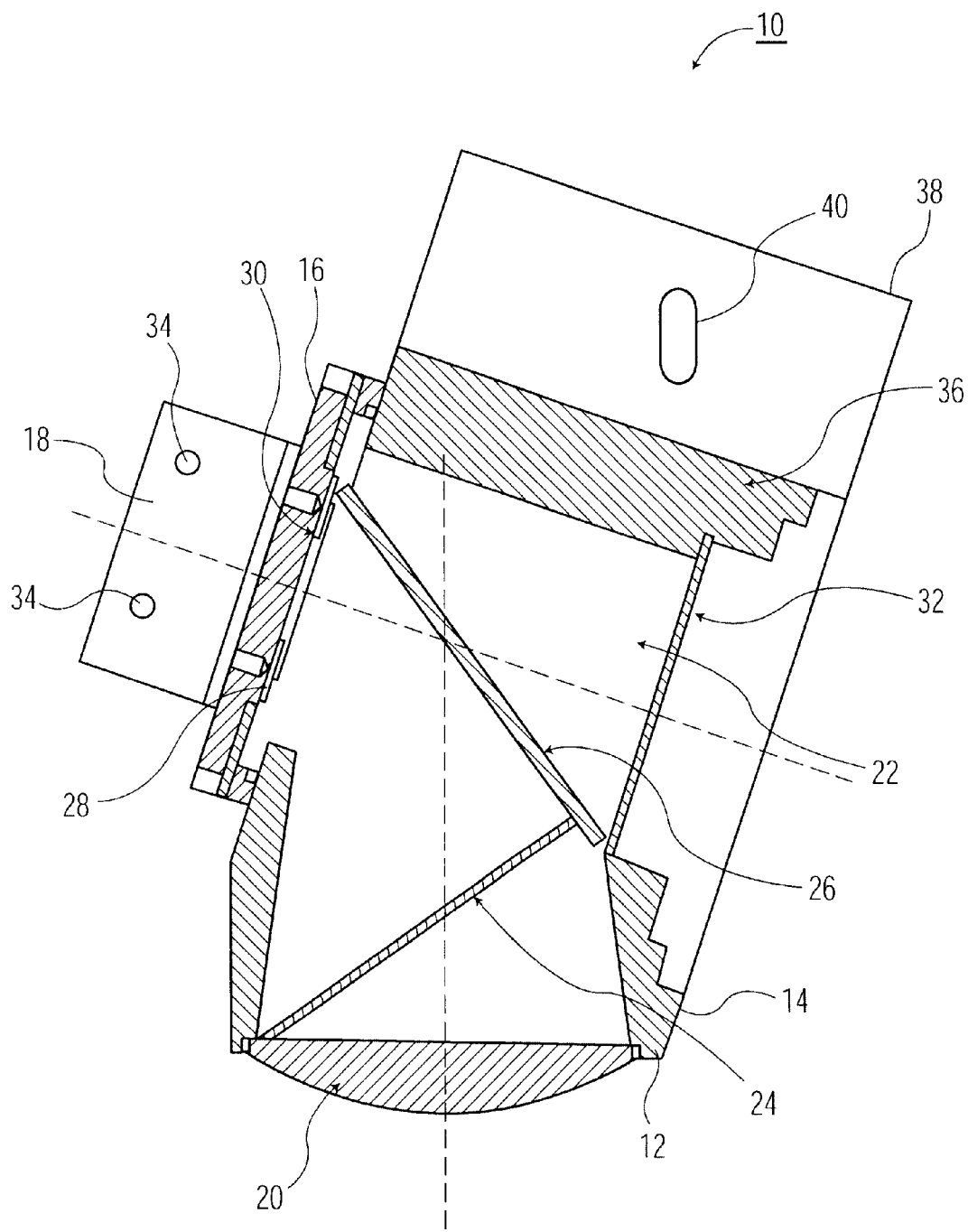
FIG. 2 simplified, schematic, sectional view of the optical projection system of FIG. 1 taken along line 2—2.

FIG. 1 illustrates an enclosure 10 of an optical projection system that is in accord with the principles of the present invention. FIG. 1 shows the enclosure 10 with a front wall 12, an angled side wall 14, and a side attachment 16. That side attachment 16 includes a mounting bracket 18. The enclosure 10 is a sealed, leak proof unit that also includes top, bottom, and back walls (the back wall is shown in FIG. 2). The front wall 12 includes an opening for a spherical lens 20, while the angled side wall 14 includes an opening for an exit window (shown in FIG. 2).

Turning now to FIG. 2, which is a simplified, schematic, sectional view of the optical projection system of FIG. 1 taken along line 2—2, the enclosure 10 is filled with a liquid 22. The liquid 22 is preferably an organic compound. The liquid 22 is selected to have a desired index of refraction, preferably an index matching an index of refraction of optical elements in the enclosure 10. The liquid may also be selected to have desirable boiling point and freezing point properties. One particularly suitable liquid is Ethylene Glycol. It is also possible to use water.

As shown in FIG. 2, a polarizer 24 is disposed behind the spherical lens 20. Alternatively, the polarizer 24 may be located in front of the spherical lens 20, outside of the enclosure 10.

Behind the polarizer 24 is a polarizing beam splitter 26. On the side attachment 16 is a reflective liquid crystal light valve 28. In front of the liquid crystal light valve is a retarder foil 30. Mounted at the opening of the angled side wall 14 is an exit window 32. The exit window 32 may be a lens, and may comprise a first optical element of a projection lens. Also shown in FIG. 2 are openings 34 in the mounting bracket 18, the back wall 36, a second bracket 38 on the back wall, and a slotted opening 40 in the second bracket. The mounting brackets 18 and 38 are used to mount the enclosure 10 in the overall projection system and will not be described further.

Still referring to FIG. 2, in operation light enters the enclosure 10 through the spherical lens 20. That lens 20 collimates the input light and directs the collimated light to the polarizer 24. The polarizer 24 substantially passes the component of the collimated light that has a predetermined polarization, and substantially prevents the component that has a polarization perpendicular to the predetermined polarization from passing through it. The passed light component is reflected by the polarizing beam splitter 26 toward the liquid crystal light valve 28. The retarder foil 30 corrects the "off-axis" component of the light from the polarizing beam splitter 26.

The liquid crystal light valve 28 selectively reflects the light from the polarizing beam splitter 26 in accordance with video information (which is not shown, but which are well known in the art of liquid crystal projectors). Significantly, the liquid crystal light valve 28 changes the polarization of its reflected light. Light reflected by the liquid crystal light valve 28 then passes though the polarizing beam splitter 26 and exits the enclosure 10 through the exit window 32. The exit window may be a first lens of a projection lens arrangement for projecting the light onto a display screen.

In the illustrated optical projection system, all optical paths between the optical components are through the liquid 22. By properly matching the refractive indexes of the liquid 22, the exit window 32, and the retarder foil 30, antireflective coatings can be eliminated. Furthermore, when all of the optical components are in the same liquid environment, thermal variations are significantly reduced or eliminated. This reduces design difficulty and improves overall performance. Furthermore, by using the spherical lens as an optical input, the need for an input window is eliminated. Additionally, stresses found in prior art optical projection systems that can cause undesirable birefringence, such as in retarder foils having antireflective coatings, are reduced.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. An optical projection system, comprising:
    an enclosure having an input opening and an exit opening;
    a first optical element in said input opening for receiving an input light;
    a beam splitter for directing at least a portion of the received input light in a predetermined direction;
    a light valve for selectively imaging the directed light from said beam splitter;
    a second optical element in said exit opening, said second optical element for passing the imaged light out of said enclosure; and
    a liquid within said enclosure;
    wherein said light valve, said first optical element, and said second optical element are in thermal communication with said liquid in said enclosure.

2. An optical projection system according to claim 1, further comprising a polarizer disposed in an optical path between the first optical element and the beam splitter, receiving the input light from the first optical element and passing polarized light to the beam splitter.

3. An optical projection system according to claim 1, further comprising a polarizer in an optical path for passing polarized light to the second optical element.

4. An optical projection system according to claim 1, wherein said first optical element is a spherical lens.

5. An optical projection system according to claim 1, wherein said second optical element is a window.

6. An optical projection system according to claim 1, wherein said second optical element is a first lens of a projection lens assembly.

7. An optical projection system according to claim 1, further including a retarder foil on said light valve.

8. An optical projection system according to claim 7, wherein said retarder foil is disposed between said light valve and said beam splitter.

9. An optical projection system according to claim 7, wherein said liquid has an index of refraction substantially the same as that of said retarder foil.

10. An optical projection system according to claim 9, wherein said liquid has an index of refraction substantially the same as that of said second optical element.

11. An optical projection system according to claim 1, wherein said liquid immerses said polarizer and said beam splitter.

12. An optical projection system according to claim 1, wherein optical paths within said enclosure pass through said liquid.

13. An optical projection system according to claim 1, wherein said liquid, said polarizer, and said beam splitter have substantially a same temperature.

14. An optical projection system according to claim 1, wherein said light valve is a reflective liquid crystal light valve for selectively directing the imaged light by reflection toward said exit opening.

15. An optical projection system according to claim 14, wherein the imaged light reflected by said liquid crystal light valve passes through said beam splitter.

16. An optical projection system according to claim 14, wherein the imaged light reflected by said liquid crystal light valve is reflected through said exit opening by said beam splitter.

17. An optical projection system according to claim 1, wherein said liquid is Ethylene Glycol.

18. An optical projection system according to claim 1, wherein said enclosure is leak proof.

19. An optical projection system according to claim 1, wherein said imaged light passes through said beam splitter.

20. An optical projection system according to claim 1, wherein said imaged light is reflected by said beam splitter through said exit opening.

21. An optical projection system according to claim 1, wherein said enclosure includes an external bracket.

22. A method of projecting light, comprising:
    passing light through a first optical element into a liquid;
    polarizing light from the first optical element and passing the polarized light through the liquid;
    selectively reflecting the polarized light back through the liquid with a light valve; and
    passing the selectively reflected light though a second optical element as projected light;
    wherein said first optical element, said second optical element and said light valve are in thermal communication with liquid.

23. A method of projecting light according to claim 22, wherein passing light through the first optical element into the liquid includes collimating the light.

24. A method of projecting light according to claim 22, further including beam splitting the light passing through the liquid.

25. A method of projecting light according to claim 22, further including optically retarding the polarized light.

26. An optical projection system, comprising:
    an enclosure having an input opening and an exit opening;

a spherical lens in said input opening, said spherical lens for collimating input light;

a polarizer receiving collimated light from said spherical lens, said polarizer for passing a portion of the collimated light having a first polarization;

a beam splitter for reflecting light from the polarizer onto a predetermined optical path;

a liquid crystal light valve including a retarder foil, said liquid crystal light valve for selectively reflecting light from said beam splitter back through said beam splitter;

an exit window for passing selectively reflected light from said beam splitter through said exit opening; and a liquid within said enclosure immersing at least a portion of said retarder foil;

wherein said spherical lens, said liquid crystal light valve and said exit window are in thermal communication with the liquid.

27. The optical projection system of claim 26, wherein said liquid substantially fills said enclosure.

28. The optical projection system of claim 26, wherein the predetermined optical path passes through said liquid in said enclosure.

29. The optical projection system of claim 26, wherein the selectively reflected light from the beam splitter passes through the liquid.

* * * * *